United States Patent [19]

Miller

[11] Patent Number: 5,591,474
[45] Date of Patent: Jan. 7, 1997

US005591474A

[54] METHOD OF PREPARATION OF CHOCOLATE CRUMB

[76] Inventor: Van Miller, R.R. # 2, Brisbane, Erin Ontario, Canada, N0B 1T0

[21] Appl. No.: 581,133

[22] Filed: Dec. 29, 1995

[51] Int. Cl.$^6$ ............................................. A23G 1/00
[52] U.S. Cl. ........................ 426/580; 426/584; 426/585; 426/586; 426/587; 426/602; 426/613; 426/660
[58] Field of Search ............................ 426/580, 584, 426/585, 586, 587, 602, 613, 660

[56] References Cited

U.S. PATENT DOCUMENTS

| | | | |
|---|---|---|---|
| 4,086,371 | 4/1978 | Minifie | 426/658 |
| 4,346,121 | 8/1982 | Turos | 426/580 |
| 5,419,635 | 5/1995 | Schulte | 366/85 |

OTHER PUBLICATIONS

Bernard W. Minifie, "Chocolate, Cocoa & Confectionery: Science & Technology", copyright 1980, pp. 108 through 114.

Sven Ove Hansen & Poul Sloth Hansen, "Spray Dried Milk Powder for the Manufacture of Milk Chocolate", Feb. 1990, pp. 79 through 82.

Gerard Hogenbirk, "The Influence of Milk Fat on the Crystallization Properites of Cocoa Butter & Cocoa Butter Alternatives", 1990, pp. 53 through 60.

C. M. Barna, R. W. Hartel & S. Metin, "Incorporation of Milkfat Fractions into Milk Chocolate", 1992, pp. 62 through 71.

Primary Examiner—Jeanette Hunter
Attorney, Agent, or Firm—Donald E. Hewson

[57] ABSTRACT

Chocolate crumb is prepared, to be used later in the manufacture of milk chocolate. One feature of milk chocolate, and the chocolate crumb which is a major constituent thereof, is that the sugar is at least partially caramelized, and the caramelization contributes to the flavor of the milk chocolate. The present invention provides a process whereby only a portion of the sugar constituent of the chocolate crumb is first caramelized by being hydrated with a portion of the milk which is to be utilized in the process. That hydrated sugar with the milk is heated so as to caramelize the sugar and so as to substantially drive off the water constituent of that first portion of the milk. The temperature and the length of time for which the heating continues will govern the degree of caramelization. The then caramelized slurry batch is added to the remainder of the milk to be used, and dried so as to drive off the remaining water carried into the mix by the additional milk. That dried mix is thereafter mixed with anhydrous cocoa butter and anhydrous cocoa liquor in the proper amounts so as to form the chocolate crumb; and if the fat constituency is too low, such as when skim milk has been used, an additional amount of anhydrous butter fat can be added to the final mix to bring the final analysis of the total amount of dried milk solids and anhydrous butter fat up to specified amounts for milk chocolate. This process provides a more economical way to produce chocolate crumb, since there is less requirement for large and expensive caramelization and heat exchange equipment, and the process is easier to control.

14 Claims, No Drawings

METHOD OF PREPARATION OF CHOCOLATE CRUMB

FIELD OF THE INVENTION

This invention relates to the milk chocolate industry, and particularly is directed to methods of preparation of chocolate crumb, from which milk chocolate may subsequently be produced. The present invention provides a process whereby significant savings in cost of capital equipment and cost of production, together with closer control as to flavor color, and fat availability, may be achieved, as compared with previously known methods for production of chocolate crumb.

BACKGROUND OF THE INVENTION

Chocolate is one of the world's favorite food products, and may be found in a variety of forms including dark chocolate, white chocolate, and milk chocolate. Chocolate is, of course, a food substance, of which principal constituents are chocolate liquor and cocoa butter, both of which are derived from cocoa beans, together with sugar. When milk chocolate is prepared, the formulation will include milk solids, including butter fat, as well. Milk chocolate is substantially anhydrous.

While many countries have their own standards for milk chocolate, it is essentially universally held that there must be no less than 12% of milk solids—and usually in the range of 20% to 35%, including butter fat—included in the milk chocolate formulation. The fat system which is found in milk chocolate is the combination or blend of cocoa butter together with butter fat. It follows that milk chocolate is a suspension, in which the milk solids and sugar are suspended in a fat system.

Indeed, a general consideration during the production of milk chocolate is that the available butter fat which comes from the milk constituent, and which is added to the chocolate formulation, must be miscible with the cocoa butter and will blend with the cocoa butter so as to form the fat system of the milk chocolate. It is well noted that cocoa butter and butter fat have quite dissimilar characteristics, although they may be tempered in a similar fashion at specific tempering temperatures and dwell times, in order to achieve the required chocolate characteristics of hardness and snap. Cocoa butter and butter fat do not form a eutectic within which various fat crystal structures can be detected with the desired characteristics being available only within very narrow ranges; and thus, the compatibility as to crystalline structure and as to hardness between the butter fat and cocoa butter are important to the chocolate maker. Certain aspects thereof, however, are outside the scope of the present invention.

Of particular concern to the present invention, on the other hand, is the fact that the degree of caramelization of sugar, which is a major constituent of the milk chocolate, will have noticeable and, in some cases, profound effects on the flavor—and, indeed, on the color—thereof. The degree of caramelization will vary from manufacturer to manufacturer, depending on the manner in which they perceive market acceptance; and the degree of caramelization may vary from country to country, with higher caramelization being more evident in the United Kingdom than, say, in North America.

The production of milk chocolate generally will follow one of several different processes. One approach is to mix a chocolate nib, together with sugar, milk powder, and cocoa butter and, after being mixed together, the mix is refined, pasted, and conched. Another approach is to mix together chocolate liquor, pulverized sugar, milk powder, and cocoa butter, followed by refining, pasting, and conching. Indeed, the milk powder which may be used in those processes may conveniently be the milk powder which is described in Applicant's copending United States patent application Ser. No. 08/543,571, filed Oct. 16, 1995.

A third, very common process for the production of milk chocolate, is to mix together chocolate crumb together with cocoa butter in a mixer or paster, refining the mix, and then re-pasting the mix, and finally conching. The advantage of that process is that the chocolate crumb, which is in a powder form, may have been manufactured previously, up to many months previously; or, indeed, the chocolate crumb may have been manufactured in an entirely different factory or even in a different country. Another particular advantage of the use of chocolate crumb is that it has extremely good storage and keeping properties, provided that it is stored in such a manner that it will not readily pick up moisture, and it provides a product which will generally meet very strict bacteriological specifications, especially when compared with other milk products. Yet a further advantage of manufacturing chocolate crumb is that very considerable quantities may be manufactured during periods when milk productivity is high, such as during the summer, and may then be utilized for milk chocolate manufacture during the winter when the production quantities of milk may have been reduced.

Previously, milk chocolate crumb has particularly been developed, and the processes improved and adopted by manufacturers in the United Kingdom. As mentioned, milk chocolate requires that the sugar constituent of the chocolate shall be at least partly caramelized, and the flavor and color of the caramelization will carry into the milk chocolate product when it is produced. Moreover, milk chocolate is quite sweet, and the predominant constituent thereof is sugar. Thus, flavor contributions to the milk chocolate come particularly from caramelized sugar and from the chocolate liquor, as well as from the sugar.

Traditionally, factories for the production of chocolate crumb have generally been situated in dairy regions. The general processes followed for the production of chocolate crumb, up to the present time, are as follows:

Milk is brought into the factory, filtered, cooled, and stored. Usually, the milk is then evaporated or condensed, so that the still liquid milk product contains about 30% up to 40% of total solids; it being understood that whole milk will contain about 12% milk solids, including butter fat. Sugar is added to the condensed milk, in keeping with the particular recipe of the chocolate manufacturer, and that mix is then condensed to become about 90% solids. At that time, some of the sugar constituent in the mix will begin to crystallize.

The milk and sugar concentrate is then added to cocoa liquor and kneaded, during which crystallization of the sugar will continue.

Then, the concentrate is dried at temperatures generally ranging from 75° C. up to 110° C. for from 4 to 8 hours. Close control is required because during the drying process caramelization of the sugar will be brought about. It follows, therefore, that the flavor of the milk chocolate which will ultimately be produced will be quite dependent upon the time and temperature at which the concentrate has been dried, and from which the degree of caramelization of the sugar is controlled.

The then prepared crumb is removed from the oven or dryer where it has been prepared. The crumb is essentially anhydrous, having less than 1% moisture.

Alternatively, instead of the concentrate having been kneaded, it may be passed to a heat exchanger evaporator. There, the solids of the concentrate are increased to about 95% or 96%, and caramelization of the sugar occurs at the same time. This process is much faster, because the cooking time is limited to about 2 to 5 minutes, depending on the extent of the caramelization of the sugar which is required.

A typical milk crumb composition may be essentially as follows:

cocoa liquor, about 5% by weight of the crumb composition, up to about 13.5% by weight of the crumb composition;

the fat constituent carried into the crumb composition by the cocoa liquor may be from about 2.8% by weight of the crumb composition up to about 7.3% by weight thereof;

about 53% of the crumb composition will be sugar;

milk solids of the crumb composition will be about 32%, of which about 9.2% by weight of the crumb composition is fat;

there may be limited amounts of moisture, generally below 1%;

there may also be an additional amount of cocoa butter added to the crumb composition, in keeping with the present invention as described hereafter, in an amount up to about 10%;

the fat content of the chocolate crumb will generally be in the range of 16.5% to about 22%;

the milk solids in the chocolate crumb, not including butter fat, will generally be about 23%; and the total amount of dried milk solids and butter fat found in milk chocolate crumb will generally be in the range of about 30% to 34% by weight.

As noted previously, the production of milk chocolate may follow many months later than the production of the chocolate crumb, and in a different location. The chocolate crumb is mixed together with cocoa butter to form a paste, it is refined and then re-pasted, and finally it is conched so that the mixture obtains a fine chocolate with very low particle size.

Further discussion of the product and manufacture of chocolate, with particular emphasis on milk chocolate, as the industry had developed up to about 1980, is found in *Chocolate, Cocoa and Confectionary: Science and Technology,* second edition, by Bernard W. Minifie, copyright 1980, published by AVI Publication Company, Inc., of Westport, Conn., U.S.A., at pages 105 through 114.

A further prior teaching of machinery for the production of chocolate crumb is MINIFIE et al U.S. Pat. No. 4,086, 371, issued Apr. 25, 1978. That patent teaches a continuous process for production of a crumb product, particularly chocolate crumb, where a feed stock of sugar, milk solids, a significant amount of moisture, and chocolate when required, is heated to about 125° C. and condensed to have a moisture content of about 4% to 6%. A vertical column is employed, and the condensed material is maintained at its final temperature until it is transferred to a crystallizer. There, the product is moved downwardly and kneaded and, at the same time, it is cooled. This results in a crystallized particulate product, where the sugar has been caramelized to an extent governed by the temperature and dwell time.

The present invention provides a batch process, by which the same flavor profile is achieved, with the same caramelization flavor contribution for chocolate crumb as has been found in prior methods, but in an easier process to control and with lower capital investment. Chocolate crumb with substantially the same analysis and fat profile as previously has been manufactured is provided by the present invention; and in keeping with certain aspects of the present invention, there may be higher availability of fat to enter into the fat system of the chocolate crumb.

The present inventor has found that, quite unexpectedly, it is possible to obtain the same flavor profile in chocolate crumb by taking only a portion of the sugar content which will be found in the chocolate crumb and hydrating it with a small portion of milk, of which the water content is just sufficient to hydrate the sugar. If that hydrated sugar is then cooked or heated sufficiently to a point where a desired degree of caramelization is achieved, then there will be sufficient caramelization to flavor an entire batch having 100% sugar contribution, and of which only a small portion of the sugar has been caramelized. The desired flavor profile for the entire batch, having the same flavor as prior milk chocolate crumbs, will be achieved. The color for the entire batch will also be equivalent to prior milk chocolate crumbs. The steps by which these effects are achieved are discussed hereafter.

Accordingly, it is an object of the present invention to provide processes for the manufacture of chocolate crumb having the same composition and the same flavor profile, and color, of prior chocolate crumbs, but manufactured using simpler equipment and with excellent control, and in which only a portion of the entire sugar content of the chocolate crumb has been caramelized.

It is further object of the present invention to provide such chocolate crumb using skim milk, whole milk, or condensed milk, during certain steps taken in the process.

Indeed, another feature of the present invention is that the processes of the present invention are equally applicable to the preparation of white chocolate crumb; it being understood that white chocolate crumb is essentially the same as chocolate crumb except that no cocoa liquor is used in its preparation, and the analysis thereof may be slightly different than ordinary chocolate crumb.

In certain features of the invention, therefore, total fat availability is provided, notwithstanding that in ordinary processes some butter fat may be encapsulated in the serum products of whole milk as it is dried during production of the chocolate crumb, and is unrecoverable as fat to enter the fat system of the chocolate crumb.

SUMMARY OF THE INVENTION

In accordance with one aspect of the present invention, there is provided a method of preparing chocolate crumb which is substantially anhydrous, and wherein the prepared chocolate crumb will have a final analysis, expressed in weight units, as follows:

| | |
|---|---|
| dried milk solids | 23% to 34% |
| sugar | 50% to 55% |
| anhydrous cocoa butter | 8% to 12% |
| anhydrous cocoa liquor | 4% to 8% |
| additional anhydrous butter fat | 0% to 10% |
| moisture | less than 1% |

Within the above analysis, the total amount of dried milk solids and anhydrous butter fat is in the range of 30 to 34 weight units. In keeping with a particular provision of the present invention, at least a portion of the sugar constituent, which portion is approximately 20 weight units, is caramelized at an elevated temperature for flavor purposes, as it is found in the prepared chocolate crumb.

The general steps whereby the prepared chocolate crumb is manufactured, are as follows:

(a) First, a first portion of liquid milk is mixed with a first portion of sugar which, as noted above is approximately 20 weight units. The first portion of liquid milk comprises a first portion of milk solids and a first portion of water; and the first portion milk solids may include butter fat but does not necessarily include butter fat, as discussed hereafter. The first portion of water is just sufficient so as to hydrate the first portion of sugar which has been chosen; and a slurry batch of the hydrated sugar and liquid milk is formed.

(b) The slurry batch is heated to a temperature of about 105° C. to 115° C., and maintained at that temperature for sufficient time so as to caramelize the sugar to a selected degree of caramelization. That time is also sufficient to substantially drive off the first portion of water, thereby leaving a caramelized slurry batch which comprises the caramelized sugar and the first portion of milk solids which has been carried into it from the first portion of milk.

(c) The caramelized slurry batch is maintained at an elevated temperature, so as to remain heated, and thereby so as to maintain the sugar in suspension.

(d) A second portion of liquid milk is obtained, with the total weight of milk solids of that second portion of liquid milk, together with the milk solids from the first portion of liquid milk being within the range of 23 to 34 weight units.

(e) The still heated caramelized slurry batch is mixed together with at least some of the second portion of liquid milk, so as to rehydrate the caramelized sugar in the slurry batch. Then, the remainder of the second portion of liquid milk, if it has not already been used, is added to the batch, so as to form a pre-crumb slurry.

(f) The pre-crumb slurry is transferred to a conventional drier, where it is dried so as to obtain the total weight of milk solids (which, as noted above, is within the range of 23 to 34 weight units), as dried milk solids. The caramelized sugar is also present in the dry pre-crumb slurry.

(g) The total weight of dried milk solids and the caramelized sugar obtained from step (e) above are mixed together with the remaining sugar, the anhydrous cocoa butter, and the anhydrous cocoa liquor, all in keeping with the above, so as to arrive at the selected analysis amounts of each of them.

(h) Additional anhydrous butter fat may be added to the mixture, if necessary, so as to bring the total amount of dried milk solids and anhydrous butter fat up to the range of 30 to 34 weight units of the prepared chocolate crumb.

(i) Finally, the prepared chocolate crumb is refined, if required, so that it may be pasted and conched as may be necessary for recovery and further processing in the manufacture of milk chocolate. The prepared chocolate crumbs may then be stored so as to be used at a later time.

Briefly, therefore, the preparation of slurry batch utilizes a portion of the sugar and a portion of the milk constituent, whereby the sugar is hydrated and heated so as to be caramelized. The amount of caramelization is to a sufficient degree that the same flavor profile is achieved when the entire batch is prepared, as would be from the prior art chocolate crumb processes. Thereafter, the remaining milk is added to the dried caramelized slurry batch, dried, and mixed with the remaining constituents including additional anhydrous butter fat, if necessary.

DETAILED DESCRIPTION OF THE PREFERRED EMBODIMENTS

As noted above, a convenient expression for the final analysis of prepared chocolate crumb, in keeping with the present invention, is set forth in the following table, where the presence of each of the constituents is stated in weight units.

| ANALYSIS OF PREPARED CHOCOLATE CRUMB | |
| --- | --- |
| dried milk solids | 23 to 34 weight units |
| sugar | 50 to 55 weight units |
| anhydrous cocoa butter | 8 to 12 |
| anhydrous cocoa liquor | 4 to 8 |
| additional anhydrous butter fat | 0 to 10 |
| moisture | less than 1 |

The weight unit which is employed may be pounds or kilograms; typically, a weight unit is 10 kilograms, and the size of a batch of prepared chocolate crumb is in the range of 1,000 kilograms.

Of the above analysis, the total amount of dried milk solids contributed from milk, together with any additional anhydrous butter fat that is added to the mixture in the event that skim milk has been used, is in the range of 30 to 34 weight units, typically 300 to 340 kilograms.

The manufacture of chocolate crumb in keeping with the present invention requires that a first portion of sugar constituent, approximately 20 weight units and typically 200 kilograms, is caramelized at an elevated temperature so as to provide the caramelization flavor contribution to the milk chocolate crumb and thence to the milk chocolate when it is manufactured.

The first step, therefore, is to hydrate the first portion of sugar with an appropriate first portion of liquid milk. Typically, if 200 kilograms of sugar is to be hydrated, it takes approximately 100 kilograms of milk. Whether that milk is whole milk or skim milk, either will work; if whole milk is employed, then there will be butter fat included in the milk together with milk solids, and if skim milk is used, then there will be no butter fat. In any event, the water or moisture portion of the milk is intended to be just sufficient so as to hydrate the first portion of sugar that is employed. Thus, a slurry batch is formed of the hydrated sugar and liquid milk.

Then, the slurry batch is heated in a convenient, controllable heater. The temperature to which the slurry batch is heated is generally in the range of 105° C. to 115° C., at which temperature caramelization of the sugar will occur. The slurry batch is maintained at the temperature to which it has been heated for a sufficient time so as to caramelize the sugar to a required or selected degree of caramelization. At the same time, most or substantially all of the water is driven off, thereby leaving a caramelized slurry batch which comprises the caramelized sugar and the milk solids carried into the slurry batch with the first portion of milk that has been employed. The degree of caramelization may vary, and is a matter of choice in keeping with the decision of the chocolate maker. The precise times and temperatures used are beyond the scope of the present invention, because they are matters of choice and flavor. However, as noted, by choosing a degree of caramelization, that flavor enters into the flavor profile for the prepared chocolate crumb when it has been manufactured. Also, dark caramelization will come as a consequence of higher temperature heating and/or longer dwell times, while lighter caramelization will result from lower temperatures and/or shorter dwell times. Moreover, there will be less residual moisture in a dark caramelized slurry batch than in a lighter colored caramelized slurry batch. The caramelized slurry batch is maintained at an elevated temperature (usually 80° C. to 115° C.), so as to remain heated.

A second portion of liquid milk is then chosen, with the following condition: The total weight of milk solids of that second portion of liquid milk, together with the milk solids of the first portion of liquid milk, must be within the range of 23 to 34 weight units. If the second portion of liquid milk is skim milk, then the combined weight of milk solids from the first and second portions of liquid milk will be at the lower end of the range. If the second portion of liquid milk is whole milk, and if the first portion of liquid milk has also been whole milk, then the total weight of milk solids including butter fat from both the first and second portions of liquid milk may be near the top of the range of 23 to 34 weight units.

Moreover, the second portion of liquid milk may, itself, be condensed milk. From which water in an amount of 30% to 50% by weight of the milk portion has been removed. Further details are discussed hereafter.

In any event, the still heated caramelized slurry batch and the second portion of liquid milk, or at least some of that second portion of liquid milk, are mixed together to form a pre-crumb slurry. This rehydrates the caramelized sugar. If not all of the milk has been used, the remainder of the second portion of liquid milk is added to the pre-crumb slurry. By this stage, all of the milk to be utilized in the manufacture of the chocolate crumb batch has been used. The pre-crumb slurry is then dried in a conventional drier, so that there will be obtained from the pre-crumb slurry the total weight of milk solids as dried milk solids as they were brought into the mixture up to this stage, together with the caramelized sugar from the slurry batch. any residual moisture remaining in the caramelized slurry batch will also be substantially driven off in the drier.

In practice, a conventional dryer as it may be used either in a chocolate crumb factory or in a chocolate manufacturing facility is usually run continuously, rather than in batches. Thus, the step of drying the pre-crumb slurry, and the steps which follow, may be run on a centralized conventional dryer and subsequent mixers, refiners, pasters, or conchers, where pre-crumb batches from differing units may be fed in a sequential fashion. This makes more economic and efficient utilization of such equipment, while permitting the installation of much smaller batching equipment than has been known previously. Considerable savings in capital cost may therefore be effected.

It should also be noted that the present invention is also applicable to the production of white chocolate crumb. The particular difference between chocolate crumb and white chocolate crumb is the fact that white chocolate crumb is prepared without utilization of cocoa liquor, buy may require additional cocoa butter together with sugar and milk constituents. There may have to be some adjustments made to the constituents, in order to maintain a reasonable fat presence in the white chocolate crumb, but otherwise the apparatus and processes as discussed herein are applicable.

In any event, the dried milk solids and the caramelized sugar that are obtained from the dried pre-crumb slurry are mixed together with the remaining sugar, and the amount of anhydrous cocoa butter and anhydrous cocoa liquor that are to be brought into the chocolate crumb, according to the specific recipe established by the chocolate maker for that batch. There is, thus, obtained a mixed batch, which has the consistency of a paste, and which contains all of the dried milk solids, all of the sugar, all of the anhydrous cocoa butter, and all of anhydrous cocoa liquor, according to the recipe. However, the fat constituent of the chocolate crumb may still be too low, in that the total amount of dried milk solids including butter fat may be below the range of 30 to 34 weight units. This will occur, particularly, if skim milk has been used in preparation of the pre-crumb slurry.

If so, then additional anhydrous butter fat can be added to the mixture, thereby bringing the total amount of dried milk solids together with anhydrous butter fat up to the range of 30 to 34 weight units of the prepared chocolate crumb.

Finally, the batch may then be refined, pasted, and conched, in keeping with ordinary procedures therefor, and as necessary. The prepared chocolate crumb is then recovered and then further processed into milk chocolate, or stored for later use.

It is well known that the milk solid constituent of whole milk, including butter fat, is generally in the range of about 12%. One approach to the process of the present invention is for the second portion of liquid milk that is used in step (e), as discussed above, to be sufficient to yield an amount of dried milk solids which, when added to the milk solids from the first portion of liquid milk that has already been used in the preparation of the slurry batch, will be in the range of up to 30 to 34 weight units, including butter fat. This, therefore, contemplates use of whole milk in both of the first and second liquid milk portions used during the crumb preparation according to the present invention.

As noted, approximately 10 weight units of liquid milk is utilized in the preparation of the slurry batch, and that provides sufficient moisture to hydrate the sugar which is used in the slurry batch.

If, on the other hand, skim milk is used, it has a milk solid constituent of about 9%, and no butter fat. Thus, with the use of skim milk, the dried milk solids may only be to the range of about 24 weight units, or somewhat higher. In any event, they may fall well below the required range of 30 to 34 weight units, and thus up to 9 weight units of anhydrous butter fat may be added in the final preparation of the chocolate crumb in step (h), as noted above.

According to the present invention, therefore, the total fat content of the prepared chocolate crumb may be as follows:

| | |
|---|---|
| from the milk constituent | 0 to 9.6 weight units |
| from the cocoa liquor | 2.2 to 4.4 weight units |
| from the cocoa butter | 8 to 12 weight units |
| from the butter fat | 0 to 9 weight units |

If the chocolate crumb that is being prepared is white chocolate crumb, then there will be no fat contribution from cocoa liquor; but the fat contribution from cocoa butter may be in the range of 8 to 16 weight units.

The total amount of fat content, from all sources, is in the range of 16 to 24 weight units of the prepared chocolate crumb; there being dried milk solids as well in the crumb composition.

Finally, some further analysis of the contributory portions of liquid milk follows: As noted above, the first portion of liquid milk may be whole milk, having a milk solid constituent including butter fat of about 12%; or it may be skim milk having no butter fat and a milk solid constituent of up to 9.6%. The second portion may also be skim milk having up to 92% by weight of water and up to 9.6% by weight of milk solids, and no butter fat. Alternatively, the second portion may also be whole milk having up to 89% by weight of water, also up to 9.6% by weight of milk solids, and up to 5% by weight of butter fat—particularly if the milk is derived from Jersey cattle. Finally, condensed milk may be used in the second portion in the preparation of the pre-crumb slurry and it may have had 30% to 50% by weight of water removed from whole milk, so that condensed milk may comprise only 50% to 70% by weight of water, up to 14.7% by weight of milk solids, and up to 7.7% by weight of butter fat.

It is quite clear that very complicated apparatus, capable of heating and caramelizing huge batches of sugar, is not required. Thus, lower capital costs may be realized by adopting the methods of the present invention.

Moreover, by heating smaller slurry batches to caramelize the sugar, closer control over the degree of caramelization may be achieved.

It will be recognized, of course, that the above discussions have been in respect of typical chocolate crumb, or white chocolate crumb. There are no industry-wide specified standards or requirements with respect to the precise analysis of chocolate crumb or white chocolate crumb; and the use of the designation chocolate crumb may be mandated in keeping with differing standards from country to country, insofar as the analysis and presence of milk and/or fat constituents, in particular, may be concerned. However, the chocolate industry is a very large industry, and even within any one nation or chocolate producing region, utilization of chocolate crumb in keeping with any one or other set of specifications may be well established. Indeed, differing manufacturers, even in the same country, may have somewhat different requirements and specifications for their chocolate crumb, depending on the degree of caramelization, for example, and the quantity analysis of fat contribution in the chocolate crumb product, as they have established in order to meet their particular market requirements.

Finally, the flavor profile and constituency of chocolate crumb manufactured in keeping with the present invention is otherwise indistinguishable from chocolate crumb previously available and will be utilized in the same manner for the same purposes as before.

The above discussions have been particularly by way of example; it is evident that modifications to the present invention may be adopted by skilled chocolate makers, without departing from the spirit and scope of the appended claims.

What is claimed is:

1. A method of preparing chocolate crumb which is substantially anhydrous, wherein the prepared chocolate crumb will have a final analysis, expressed in weight units, as follows:

| | |
|---|---|
| dried milk solids | 23 to 34 |
| sugar | 50 to 55 |
| anhydrous cocoa butter | 8 to 12 |
| anhydrous cocoa liquor | 4 to 8 |
| additional anhydrous butter fat | 0 to 10 |
| moisture | less than 1 | wherein the total amount of dried milk solids and anhydrous butter fat is in the range of 30 to 34 weight units; and wherein at least a first portion of the sugar constituent, which first portion is approximately 20 weight units, has been caramelized at an elevated temperature for flavor purposes;

wherein said method of preparing said chocolate crumb comprises the steps of (a) mixing a first portion of liquid milk with said first portion of sugar, wherein said first portion of liquid milk comprises a first portion of milk solids and a first portion of water, which first portion of milk solids may include butter fat, and wherein said first portion of water is just sufficient so as to hydrate said first portion of sugar, so as to form a slurry batch of said hydrated sugar and liquid milk;

(b) heating said slurry batch to a temperature of about 105° C. to 115° C., and maintaining said slurry batch at that temperature for sufficient time so as to caramelize the sugar to a selected degree of caramelization and so as to substantially drive off said first portion of water, thereby leaving a caramelized slurry batch comprising caramelized sugar and said first portion of milk solids;

(c) maintaining said caramelized slurry batch at an elevated temperature so as to remain heated;

(d) obtaining a second portion of liquid milk, whereby the total weight of milk solids of said first portion of liquid milk together with the milk solids of said second portion of liquid milk is within the range of 23 to 34 weight units;

(e) mixing together said still heated caramelized slurry batch with at least some of said second portion of liquid milk so as to re-hydrate said caramelized sugar, and adding the remainder of said second portion of liquid milk if not already used so as to form a pre-crumb slurry;

(f) transferring said pre-crumb slurry to a conventional drier, and drying said pre-crumb slurry so as to obtain said total weight of milk solids as dried milk solids, together with said caramelized sugar;

(g) mixing said total weight of dried milk solids and said caramelized sugar together with the remaining sugar, the anhydrous cocoa butter, and the anhydrous cocoa liquor, so as to arrive at the selected analysis amounts of each;

(h) further adding additional anhydrous butter fat, if necessary, so as to bring the total amount of dried milk solids and anhydrous butter fat to the range of 30 to 34 weight units of the prepared chocolate crumb; and (i) refining said prepared chocolate crumb, if necessary, for pasting and conching the prepared chocolate crumb, as necessary for recovery and further processing or storage thereof.

2. The method of claim 1, wherein said first portion of liquid milk used in step (a) is whole milk, having a milk solids constituent including butter fat of about 12%; and wherein the amount of said second portion of liquid milk used in step (d) is sufficient to yield an amount of dried milk solids, which when added to said milk solids from said first portion of liquid milk, brings the dried milk solids and butter fat in said prepared chocolate crumb up to the range of 30 to 34 weight units thereof.

3. The method of claim 2, wherein the amount of said first portion of liquid milk which is added to said first portion of the sugar constituent in step (a) is approximately 10 weight units thereof.

4. The method of claim 1, wherein said first portion of liquid milk used in step (a) is skim milk, having a milk solids constituent of about 9% and no butter fat;

wherein the amount of said second portion of liquid milk used in step (e) yields an amount of dried milk solids, which when added to said milk solids from said first portion of liquid milk, brings the dried milk solids in said prepared chocolate crumb up to the range of at least 24 weight units thereof; and wherein up to 9 weight units of anhydrous butter fat is added to said prepared chocolate crumb in step (g).

5. The method of claim 4, wherein the amount of said first portion of liquid milk which is added to said first portion of the sugar constituent in step (a) is approximately 10 weight units thereof.

6. The method of claim 1, wherein the total fat content, by weight units, of said prepared chocolate crumb is as follows:

| from the milk constituent | 0 to 9.6 weight units |
|---|---|
| from the cocoa liquor | 2.2 to 4.4 weight units |
| from the cocoa butter | 8 to 12 weight units |
| from the butter fat | 0 to 10 weight units | and wherein the total amount of fat content from all sources is in the range of 16 to 24 weight units of the prepared chocolate crumb.

7. The method of claim 1, wherein said second portion of liquid milk is chosen from the group consisting of skim milk which has up to 92% by weight water, up to 9.6% by weight milk solids, and no butter fat; whole milk which has up to 89% by weight water, up to 9.6% by weight milk solids, and up to 5% by weight butter fat; and condensed milk which has 50% to 70% by weight water, up to 14.7% by weight milk solids, and up to 7.7% by weight butter fat.

8. A method of preparing white chocolate crumb which is substantially anhydrous, wherein the prepared white chocolate crumb will have a final analysis, expressed in weight units, as follows:

| dried milk solids | 23 to 34 |
|---|---|
| sugar | 50 to 55 |
| anhydrous cocoa butter | 8 to 16 |
| additional anhydrous butter fat | 0 to 10 |
| moisture | less than 1 | wherein the total amount of dried milk solids and anhydrous butter fat is in the range of 30 to 34 weight units; and wherein at least a first portion of the sugar constituent, which first portion is approximately 20 weight units, has been caramelized at an elevated temperature for flavor purposes;

wherein said method of preparing said white chocolate crumb comprises the steps of:

(a) mixing a first portion of liquid milk with said first portion of sugar, wherein said first portion of liquid milk comprises a first portion of milk solids and a first portion of water, which first portion of milk solids may include butter fat, and wherein said first portion of water is just sufficient so as to hydrate said first portion of sugar, so as to form a slurry batch of said hydrated sugar and liquid milk;

(b) heating said slurry batch to a temperature of about 105° C. to 115° C., and maintaining said slurry batch at that temperature for sufficient time so as to caramelize the sugar to a selected degree of caramelization and so as to substantially drive off said first portion of water, thereby leaving a caramelized slurry batch comprising caramelized sugar and said first portion of milk solids;

(c) maintaining said caramelized slurry batch at an elevated temperature so as to remain heated;

(d) obtaining a second portion of liquid milk, whereby the total weight of milk solids of said first portion of liquid milk together with the milk solids of said second portion of liquid milk is within the range of 23 to 34 weight units;

(e) mixing together said still heated caramelized slurry batch with at least some of said second portion of liquid milk so as to re-hydrate said caramelized sugar, and adding the remainder of said second portion of liquid milk if not already used so as to form a pre-crumb slurry;

(f) transferring said pre-crumb slurry to a conventional drier, and drying said pre-crumb slurry so as to obtain said total weight of milk solids as dried milk solids, together with said caramelized sugar;

(g) mixing said total weight of dried milk solids and said caramelized sugar together with the remaining sugar and the anhydrous cocoa butter, so as to arrive at the selected analysis amounts of each;

(h) further adding additional anhydrous butter fat, if necessary, so as to bring the total amount of dried milk solids and anhydrous butter fat to the range of 30 to 34 weight units of the prepared white chocolate crumb; and (i) refining said prepared white chocolate crumb, if necessary, for pasting and conching the prepared white chocolate crumb, as necessary for recovery and further processing or storage thereof.

9. The method of claim 8, wherein said first portion of liquid milk used in step (a) is whole milk, having a milk solids constituent including butter fat of about 12%; and wherein the amount of said second portion of liquid milk used in step (d) is sufficient to yield an amount of dried milk solids, which when added to said milk solids from said first portion of liquid milk, brings the dried milk solids and butter fat in said prepared white chocolate crumb up to the range of 30 to 34 weight units thereof.

10. The method of claim 9, wherein the amount of said first portion of liquid milk which is added to said first portion of the sugar constituent in step (a) is approximately 10 weight units thereof.

11. The method of claim 8, wherein said first portion of liquid milk used in step (a) is skim milk, having a milk solids constituent of about 9% and no butter fat;

wherein the amount of said second portion of liquid milk used in step (e) yields an amount of dried milk solids, which when added to said milk solids from said first portion of liquid milk, brings the dried milk solids in said prepared white chocolate crumb up to the range of at least 24 weight units thereof; and wherein up to 9 weight units of anhydrous butter fat is added to said prepared white chocolate crumb in step (g).

12. The method of claim 11, wherein the amount of said first portion of liquid milk which is added to said first portion of the sugar constituent in step (a) is approximately 10 weight units thereof.

13. The method of claim 8, wherein the total fat content, by weight units, of said prepared white chocolate crumb is as follows:

| | |
|---|---|
| from the milk constituent | 0 to 9.6 weight units |
| from the cocoa butter | 8 to 16 weight units |
| from the butter fat | 0 to 10 weight units | and wherein the total amount of fat content from all sources is in the range of 16 to 24 weight units of the prepared white chocolate crumb.

14. The method of claim 8, wherein said second portion of liquid milk is chosen from the group consisting of skim milk which has up to 92% by weight water, up to 9.6% by weight milk solids, and no butter fat; whole milk which has up to 89% by weight water, up to 9.6% by weight milk solids, and up to 5% by weight butter fat; and condensed milk which has 50% to 70% by weight water, up to 14.7% by weight milk solids, and up to 7.7% by weight butter fat.

\* \* \* \* \*